US008490026B2

(12) United States Patent
Sareen et al.

(10) Patent No.: US 8,490,026 B2
(45) Date of Patent: Jul. 16, 2013

(54) PAINTING USER CONTROLS

(75) Inventors: Chaitanya Sareen, Seattle, WA (US); Stephan Hoefnagels, Seattle, WA (US); Rob Jarrett, Seattle, WA (US); Jared Simpson, Seattle, WA (US); Bret Anderson, Puyallup, WA (US)

(73) Assignee: Microsoft Corporation, Redmond, WA (US)

( * ) Notice: Subject to any disclaimer, the term of this patent is extended or adjusted under 35 U.S.C. 154(b) by 869 days.

(21) Appl. No.: 12/290,151

(22) Filed: Oct. 27, 2008

(65) Prior Publication Data
US 2010/0107120 A1    Apr. 29, 2010

(51) Int. Cl.
*G06F 3/04812*    (2006.01)

(52) U.S. Cl.
USPC ............ 715/860; 715/856; 715/589; 715/861

(58) Field of Classification Search
USPC .......................................... 715/856, 859–861
See application file for complete search history.

(56) References Cited

U.S. PATENT DOCUMENTS

| | | | | |
|---|---|---|---|---|
| 4,698,625 A * | 10/1987 | McCaskill et al. | ............ | 345/157 |
| 5,270,688 A * | 12/1993 | Dawson et al. | ................ | 345/639 |
| 5,388,202 A * | 2/1995 | Squires et al. | ................ | 715/800 |
| 5,389,947 A * | 2/1995 | Wood et al. | ................... | 715/856 |
| 5,687,331 A | 11/1997 | Volk et al. | | |
| 5,754,179 A * | 5/1998 | Hocker et al. | ................ | 715/835 |
| 5,905,497 A | 5/1999 | Vaughan et al. | | |
| 5,940,078 A * | 8/1999 | Nagarajayya et al. | ........ | 715/859 |
| 6,075,531 A * | 6/2000 | DeStefano | .................... | 715/788 |
| 6,104,397 A | 8/2000 | Ryan | | |
| 6,323,884 B1 * | 11/2001 | Bird et al. | ...................... | 715/810 |
| 6,381,519 B1 * | 4/2002 | Snyder | .............................. | 701/3 |
| 6,384,837 B1 * | 5/2002 | Lee et al. | ...................... | 345/589 |
| 6,469,712 B1 * | 10/2002 | Hilpert et al. | ................. | 715/727 |
| 6,469,722 B1 * | 10/2002 | Kinoe et al. | ..................... | 715/837 |
| 6,563,514 B1 * | 5/2003 | Samar | ........................... | 715/711 |
| 6,642,947 B2 * | 11/2003 | Feierbach | ...................... | 715/861 |
| 6,721,446 B1 * | 4/2004 | Wilensky et al. | ............. | 382/162 |
| 6,918,093 B2 | 7/2005 | Broussard | | |
| 7,184,024 B2 | 2/2007 | Eftekhari | | |
| 7,245,293 B2 | 7/2007 | Hoshino | | |
| 7,339,581 B2 | 3/2008 | Katayose | | |
| 7,365,738 B2 * | 4/2008 | Molander et al. | ............. | 345/157 |
| 7,509,592 B1 * | 3/2009 | Martinez | ........................ | 715/862 |
| 7,656,413 B2 * | 2/2010 | Khan et al. | ..................... | 345/589 |

(Continued)

FOREIGN PATENT DOCUMENTS

| | | |
|---|---|---|
| CN | 101057239 | 10/2007 |
| WO | WO03005180 | 1/2003 |

OTHER PUBLICATIONS

Gajic, "TColorButton—button with color properties," Sep. 17, 2005, http://web.archive.org/web/20050917064003/http://delphi.aboutcom/od/vclwriteenhance/l/aa061104a.htm.*

(Continued)

*Primary Examiner* — Matt Kim
*Assistant Examiner* — Ryan Barrett

(57) ABSTRACT

The described implementations relate to dynamically painting user-controls. One method dynamically determines a highlight color of a user-control under a cursor on a graphical user-interface. The method also paints at least a portion of the user-control with the highlight color.

20 Claims, 7 Drawing Sheets
(4 of 7 Drawing Sheet(s) Filed in Color)

U.S. PATENT DOCUMENTS

| | | | |
|---|---|---|---|
| 7,873,916 B1* | 1/2011 | Chaudhri | 715/823 |
| 2002/0041705 A1* | 4/2002 | Lin et al. | 382/165 |
| 2002/0063740 A1* | 5/2002 | Forlenza et al. | 345/856 |
| 2002/0154141 A1* | 10/2002 | Forman | 345/626 |
| 2003/0007015 A1 | 1/2003 | Laffey et al. | |
| 2003/0107608 A1* | 6/2003 | Hong et al. | 345/863 |
| 2003/0137531 A1* | 7/2003 | Katinsky et al. | 345/716 |
| 2003/0187620 A1 | 10/2003 | Nygaard et al. | |
| 2004/0042662 A1* | 3/2004 | Wilensky et al. | 382/194 |
| 2004/0237053 A1* | 11/2004 | Impas et al. | 715/856 |
| 2005/0024328 A1 | 2/2005 | Oldfield | |
| 2005/0088452 A1* | 4/2005 | Hanggie et al. | 345/581 |
| 2005/0104864 A1* | 5/2005 | Zhang et al. | 345/173 |
| 2005/0131924 A1* | 6/2005 | Jones | 707/100 |
| 2005/0149882 A1* | 7/2005 | Iwema et al. | 715/860 |
| 2006/0001677 A1* | 1/2006 | Webb et al. | 345/594 |
| 2006/0033712 A1* | 2/2006 | Baudisch et al. | 345/157 |
| 2006/0070007 A1* | 3/2006 | Cummins et al. | 715/769 |
| 2006/0132457 A1* | 6/2006 | Rimas-Ribikauskas et al. | 345/173 |
| 2006/0156247 A1* | 7/2006 | McCormack et al. | 715/767 |
| 2007/0016872 A1* | 1/2007 | Cummins et al. | 715/769 |
| 2007/0022391 A1* | 1/2007 | Kim et al. | 715/856 |
| 2007/0067744 A1* | 3/2007 | Lane et al. | 715/860 |
| 2007/0079259 A1* | 4/2007 | Sauve et al. | 715/856 |
| 2007/0124677 A1* | 5/2007 | de los Reyes et al. | 715/705 |
| 2007/0124691 A1* | 5/2007 | Lindsay et al. | 715/765 |
| 2007/0126732 A1* | 6/2007 | Robertson et al. | 345/419 |
| 2008/0075360 A1* | 3/2008 | Li et al. | 382/155 |
| 2008/0095429 A1* | 4/2008 | Wilensky et al. | 382/164 |
| 2008/0195958 A1 | 8/2008 | Detiege | |
| 2008/0259090 A1* | 10/2008 | Rao | 345/593 |
| 2009/0028434 A1* | 1/2009 | Vanhoucke et al. | 382/182 |
| 2009/0113330 A1* | 4/2009 | Garrison et al. | 715/769 |
| 2009/0148045 A1* | 6/2009 | Lee et al. | 382/190 |
| 2009/0322676 A1* | 12/2009 | Kerr et al. | 345/158 |
| 2009/0327963 A1* | 12/2009 | Mouilleseaux et al. | 715/834 |

OTHER PUBLICATIONS

Swanson, "Photoshop Brush Tool Cheatsheet," http://www.creativetechs.com/iq/photoshop_brush_tool_cheatsheet.html, Jul. 8, 2007.*

Swanson, "Brush Tool Cheatsheet," http://creativetechs.com/tips/tip_resources/cheatsheets/Photoshop-Brush-Cheatsheetpdf, Jul. 8, 2007.*

123cursors.com, "Comet," "Comet West," "Comet Halley," Dec. 1, 2006.*

Ingenthron, "Re: Glow around your pointer," Sep. 12, 2008, http://forums.create.msdn.com/forums/p/17124/89934.aspx.*

SnarkyBytes, "Galveston Sunrise," Mar. 22, 2008, http://snarkybytes.com/2008/03/22/galveston-sunrise/.*

Chisan et al., "Video Bench—Final Report", University of Victoria, Apr. 11, 2003, http://citeseerx.ist.psu.edu/viewdoc/summary?doi=10.1.1.5.8515.*

He et al., "A Comprehensive Physical Model for Light Reflection", SIGGRAPH '91 Proceedings of the 18th annual conference on Computer graphics and interactive techniques, ACM SIGGRAPH Computer Graphics vol. 25 Issue 4, Jul. 1991, http://dl.acm.org/citation.cfm?id=122718.122738.*

Rayudu, Ravindra; "Dynamically Changing the Color's of Control's on a Form"; http://www.codeproject.com/KB/vb/Ravindra@eSoft.aspx; May 30, 2007.

"Change Color of Button with Value of Color of Dynamic Button"; http://www.actionscriotorg/forums/showthread.php3?t=13274; Jun. 28, 2002.

"TcolorButton—Button with Color Properties"; http://delphi.about.com/od/vclwriteenhance/l/aa061104a.htm; downloaded Aug. 26, 2008.

"J-Perk 6.0 User's Manual"; http://www.mcwebsoftware.com/docs/jp6manual,pdf; downloaded Aug. 26, 2008.

PCT Patent Appln. PCT/US2009/062255; International Search Report and Written Opinion of May 20, 2010; 12 pages (MS#325017.02).

Chinese Patent Appln. 200980143701.8; First Office Action dated Sep. 21, 2012; 11 pages (MS#325017.05).

* cited by examiner

PAINTING USER CONTROLS

BACKGROUND

Computers offer many functionalities to users. For instance, the user can surf the web, generate a document, and listen to music on a computer as he/she desires. Then the user may remember that he/she needs to send an email too. Often the user interacts with the computer via a graphical user-interface (GUI). A common way for the user to open an email application is to click on a control that launches the email application. Given the sheer number of applications that the user may have open on the GUI and the number of options available, the user may lose his/her train of thought during this task. The present implementations can allow the user to navigate a GUI with less effort and/or in a more natural manner which can lead to an enhanced overall user experience.

SUMMARY

The described implementations relate to dynamically painting user-controls. One method dynamically determines a highlight color of a user-control under a cursor on a graphical user-interface. The method also paints at least a portion of the user-control with the highlight color.

Another implementation is manifested as a method that identifies a group of related user-controls on a graphical user-interface. Individual user-controls can include an icon. The method also paints portions of the user-controls of the group with a color that is dynamically selected from information relating to the icon.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced. This patent application contains at least one drawing executed in color. Copies of this patent or patent application publication with color drawing(s) will be provided by the Office upon request and payment of the necessary fee.

DETAILED DESCRIPTION

Overview

This patent application pertains to painting user-controls on a graphical user-interface (GUI). Briefly, the present concepts can create a glow around the cursor on the GUI. The glow can be thought of as similar to directing a flashlight beam at the cursor. As the user moves the cursor over a user-control, such as a selectable button, the user-control is painted with a highlight color to create a colored glow. Continuing with the flashlight analogy, the colored glow could be created with a colored lens on the flashlight.

The highlight color can be dynamically selected based upon color information obtained from the user-control. For instance, an icon can occupy a portion of the user-control to quickly identify a function associated with the user-control. The present implementations can select the highlight color for painting based upon color information from the icon. The highlight color can be a dominant color determined from the color information, a complementary color, or any other color determined from the color information that can aid the user. So, for instance, if a dominant color of the icon is red and a remainder of the user-control is white, the present implementations can paint a red glow over some or all of the remainder of the user-control. Further, the painting can be done in a manner that helps to convey the location and direction of travel of the cursor over the user-control. Other implementations and/or inventive concepts are introduced below.

Exemplary Screenshots

FIGS. 1-9 show exemplary hypothetical screenshots of some implementations of the present user-control painting concepts.

Figure 1:
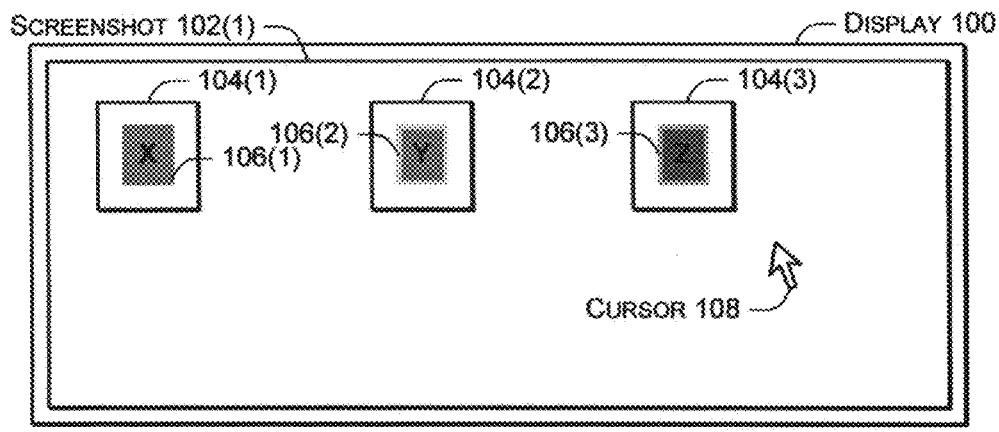
FIGS. 1-10 show hypothetical screenshots of exemplary dynamic user-control painting implementations in accordance with some of the present concepts.
Figure 2:
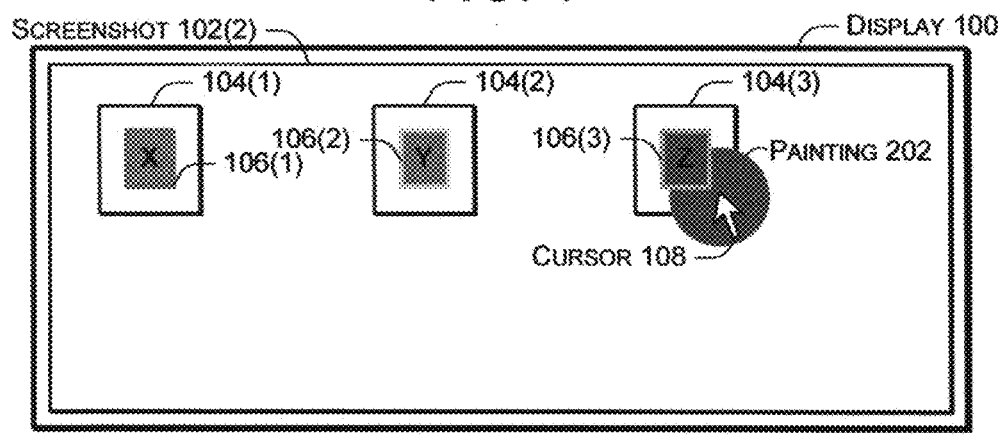
Figure 3:
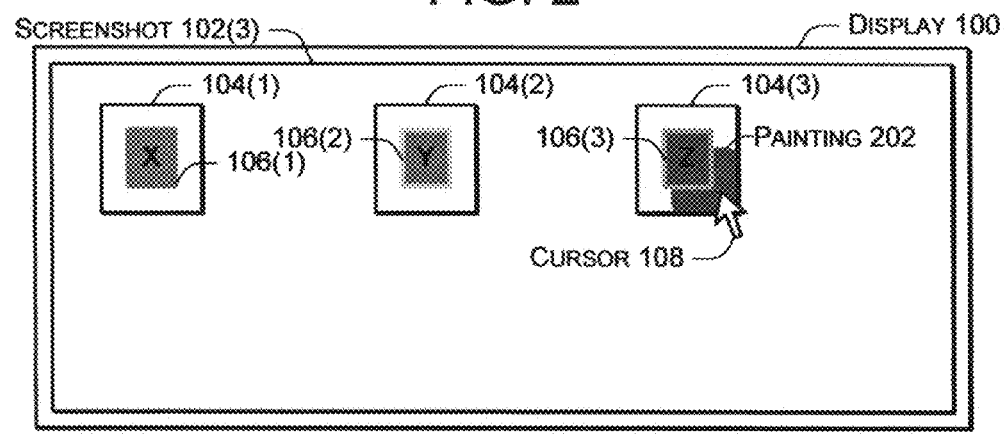

FIGS. 1-3 collectively show dynamic color painting implementations on a display 100. FIG. 1 includes a first graphical user-interface (GUI) screenshot 102(1) on the display 100. FIG. 2 includes a second, subsequent screenshot 102(2). FIG. 3 shows another screenshot 102(3) that represents an alternative configuration to the implementation of FIG. 2.

In this example, FIGS. 1-3 include three user-controls 104(1), 104(2), 104(3) on the screenshots 102(1)-102(3). Further, each of the three user-controls contains an icon 106(1), 106(2), and 106(3), respectively. An icon can be thought of as a pictorial image used in a GUI to represent a program, a command, a link to a Web page, etc. When positioned in a user-control, the icon helps to convey the functionality of the user-control (i.e., the icon serves to quickly convey what the user is selecting).

In FIG. 1, a cursor 108 is shown in a first position that is not over any of the user-controls 104(1), 104(2), 104(3). In FIG. 2, the user has moved cursor 108 over user-control 104(3). Responsive to the cursor position, user-control 104(3) is painted at 202 with a highlight color in a manner that can aid the user to easily ascertain that the cursor is over the user-control. In this case, the painting 202 is generally circular around the cursor 108 to create a colored glow, such as a halo centered around the cursor. FIG. 3 illustrates an alternative implementation where the painting 202 is masked outside of user control 104(3). Stated another way, the painting only occurs within the user control portion of the GUI.

The highlight color of the painting 202 is dynamically determined from color information of the user-control's icon 106(3). Briefly, in this case the painting color is selected as the dominant color of the icon 106(3). Methods for selecting the painting color(s) are described below in more detail relative to FIG. 12.

In these implementations, cursor 108 remains visible as the cursor passes over user-control 104(3). Also, while the cursor is super-imposed over the user-control 104(3) and the icon 106(3), the painting 202 is layered behind icon 106(3). This configuration keeps the icon visible to the user during the painting.

Figure 4:
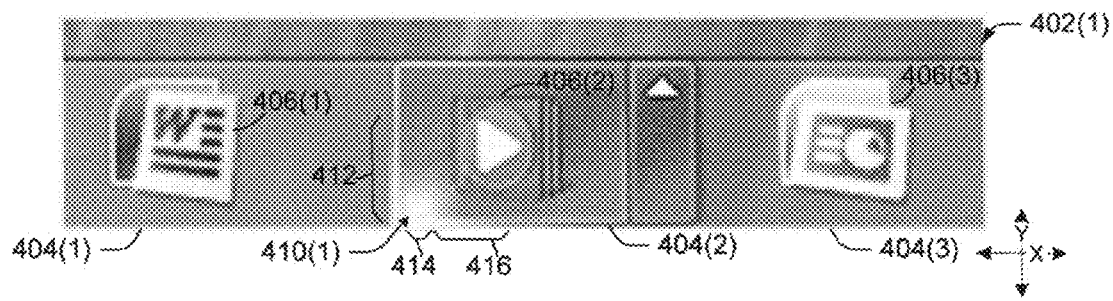
Figure 5:
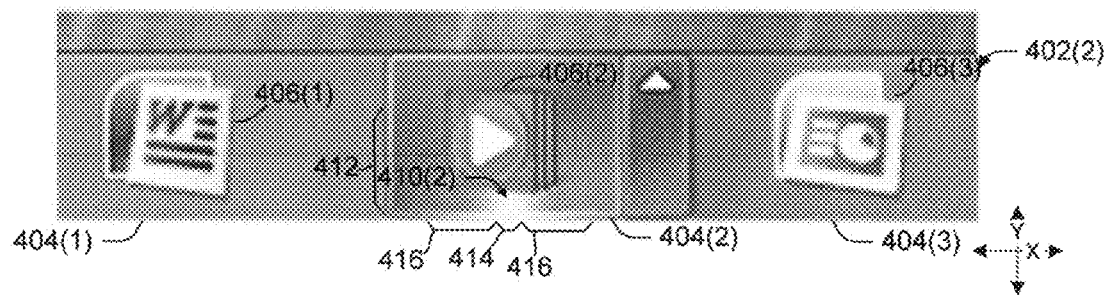
Figure 6:
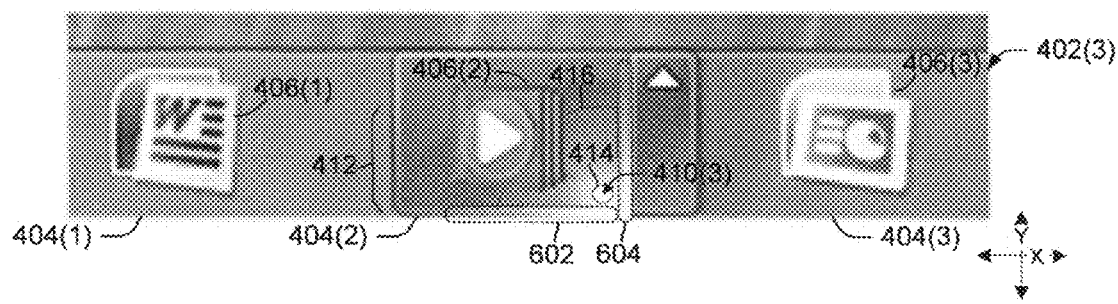

FIGS. 4-6 collectively show another dynamic color painting implementation. In this case, FIGS. 4-6 show three consecutive screenshots 402(1), 402(2), and 402(3), respectively. In contrast to FIGS. 1-3, only a portion of the overall GUI is shown in FIGS. 4-6. Each screenshot shows three user-controls 404(1), 404(2), and 404(3) and three respective icons 406(1), 406(2), and 406(3).

In FIG. 4, the user has positioned the cursor over user-control 404(2) as indicated generally at 410(1). In this configuration, as the cursor travels over the user-control, the traditional arrow shape of the cursor is replaced by painting 412. In this case, the location of the cursor is painted with an inner colored glow 414. An outer larger colored glow 416 is concentrically painted around the inner glow 414 so that the cursor location is defined as the focus of the two glows 414, 416. Similar to the implementation of FIG. 3, the painting in FIGS. 4-6 only appears within the user-control over which the cursor is positioned. Stated another way, a portion of the inner and outer glows that would otherwise extend onto user-controls 404(1), 404(3) and/or onto a remainder of the GUI are not displayed. In this particular example, the inner glow 414 is painted with a white color and the outer glow 416 is painted with a dominant color of icon 406(2), which in this case is orange. Further, in this particular example inner glow 414 is relatively concentrated while outer glow 416 is relatively diffuse. In FIGS. 4-5, brackets are utilized to identify the extent of the inner and outer glows 414, 416. FIG. 6 offers another approach utilizing dotted lines to aid the reader in identifying the glows 414, 416.

FIGS. 5-6, when compared to FIG. 4, show how the painting of the present implementations can convey cursor location and direction relative to the user-control 404(2). For instance, in FIG. 4 cursor location as identified at 410(1) is at the bottom left portion of user-control 404(2). In FIG. 5, cursor location as identified at 410(2) is at the bottom center portion of user-control 404(2) and in FIG. 6, cursor location as identified at 410(3) is at the bottom right. Taken collectively, the dynamic painting of FIGS. 4-6 show the cursor moving from left to right parallel to the horizontal or x-axis.

FIGS. 4-6 serve to illustrate another exemplary painting feature that can be termed a "refractory affect". The refractory affect can be created by painting one or more edges of a user-control proximate to the painting 412. Such an example is designated at 602 and 604 of FIG. 6.

Figure 7:
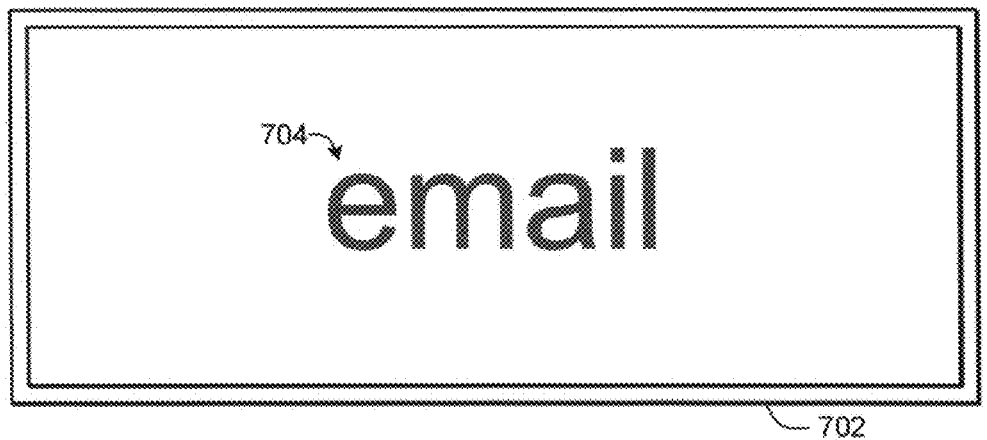
Figure 8:
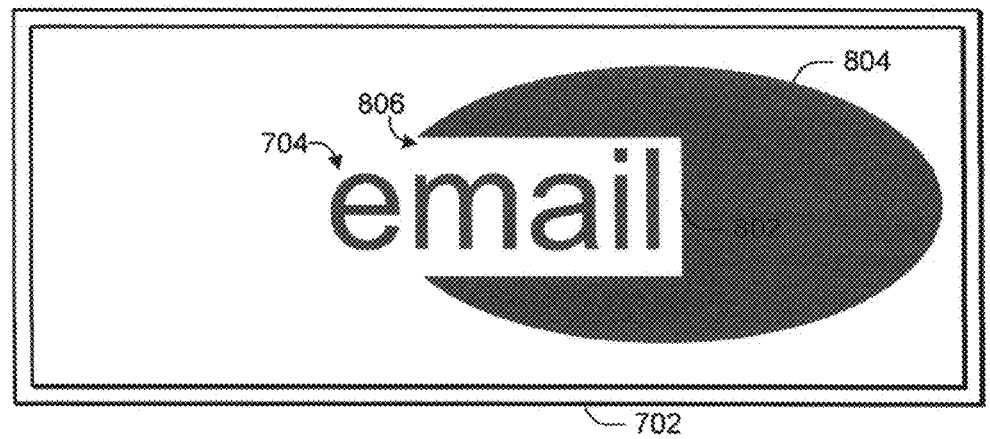

FIGS. 7-8 collectively show another dynamic color painting implementation involving a user-control 702. In this case, the user control 702 does not contain an icon. However, the user-control does contain text 704 in the form of the word "email" to help convey to the user the purpose of the user-control 702. Color information can be obtained from text 704 to paint the user-control. For instance, FIG. 8 shows an instance where the user positions the cursor over the user-control at approximately point 802. Responsively, an elliptical shape 804 is painted over a portion of user-control 702 centered on point 802. In this case, elliptical shape 804 is masked around text 704 as indicated at 806 so that the text remains visible to the user.

Figure 9:
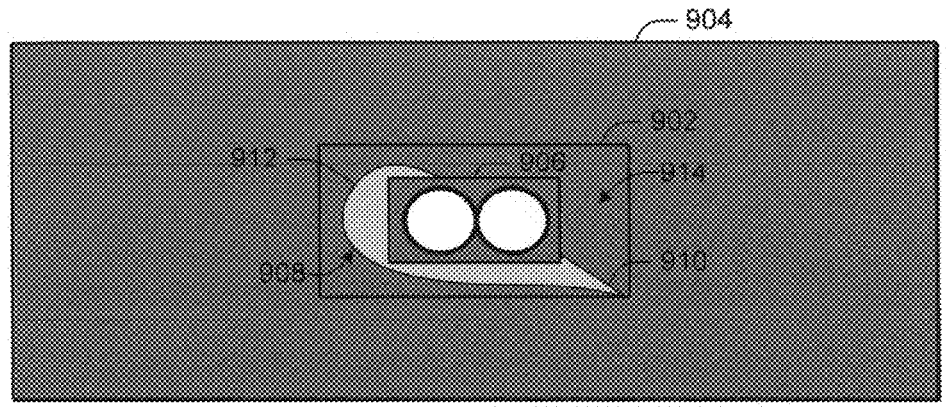

FIG. 9 shows another dynamic color painting implementation involving a user-control 902 positioned on a GUI 904. In this case, the user-control includes an icon 906. A portion 908 of user-control 902 is dynamically painted responsive to the user positioning the cursor over the user-control 902. In this example, the portion is comet-shaped so that a tail portion 910 points in the direction from which the cursor came and a head portion 912 indicates the present location of the cursor.

In this case, the user-control's icon 906 has a "blue" color. A remainder 914 of the user-control is transparent. By chance, the user has selected a similar blue color as the background for the GUI 904. Since the remainder 914 of the user-control is transparent, it also appears blue. In this scenario, rather than selecting the icon's dominant blue color for painting, the selected highlight color for the painted portion 908 is a complementary color to the dominant color. In this example, the complementary color is yellow. In some cases, such as this one, painting with a complementary color can offer an enhanced user experience when compared to painting with the dominant color.

Figure 10:
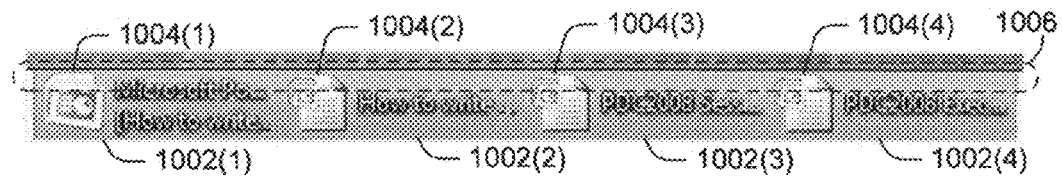

FIG. 10 shows another user-control painting implementation. In this case, four user-controls 1002(1), 1002(2), 1002(3), and 1002(4) are illustrated, each having a respective icon 1004(1), 1004(2), 1004(3), and 1004(4). The four user-controls can be thought of as a group that relates to the same application or functionality. In this case, the group relates to a PowerPoint brand application from Microsoft Corp. A dominant color of the icons is determined and painted over portions of the four user-controls 1002(1), 1002(2), 1002(3), and 1002(4) as indicated at 1006 to aid the user in recognizing the related nature of the four user-controls.

Exemplary Operating Environments

Figure 11:
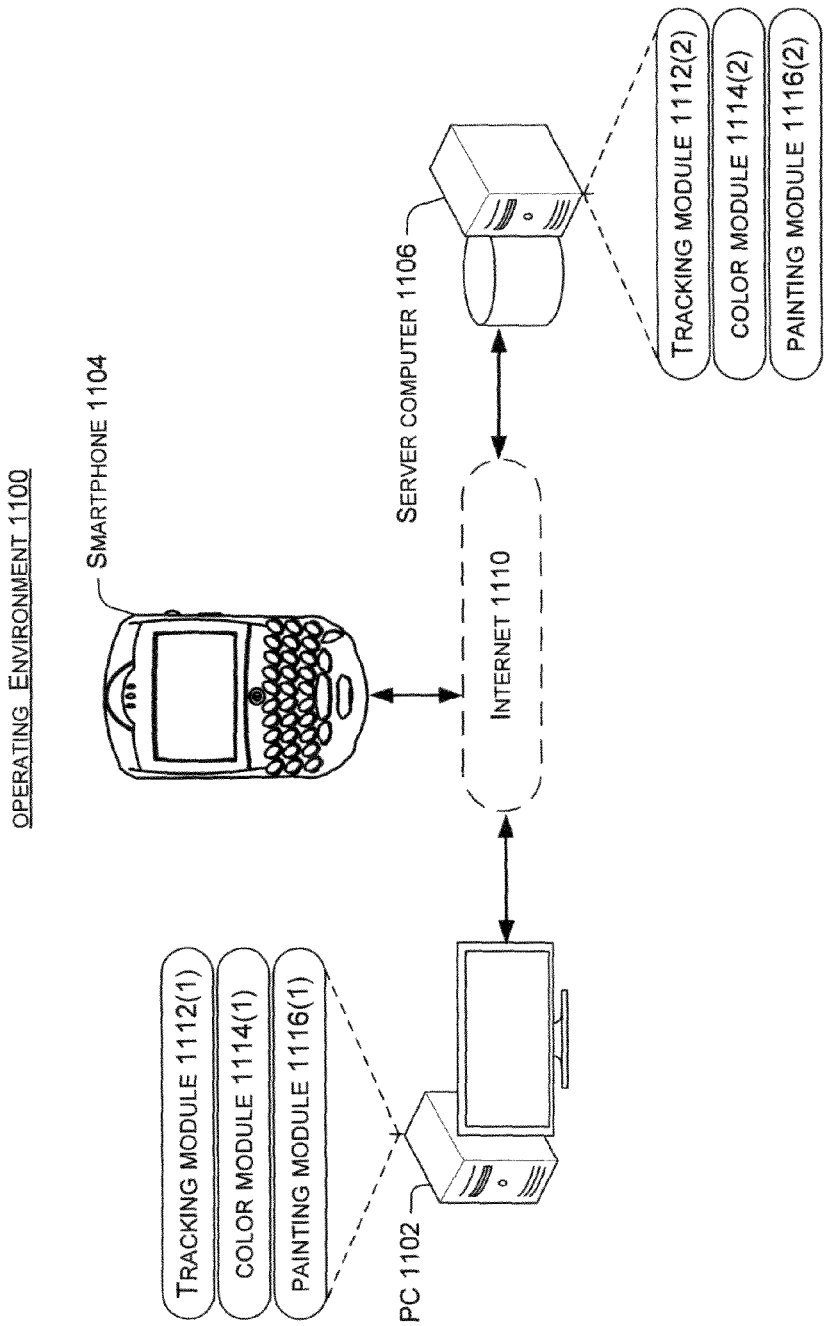
FIG. 11 illustrates an exemplary dynamic user-control painting system in accordance with some implementations of the present concepts.

FIG. 11 shows an exemplary operating environment 1100 in which dynamically painting user-control concepts described above and below can be implemented on various computing devices. Briefly, the present implementations can be implemented with any computing device that displays a graphical user-interface and employs a cursor that is controllable by a user. Further, the present implementations can be employed in a stand-alone configuration and/or a server/client configuration.

In the illustrated case, the computing devices are manifested as a personal computer (PC) 1102, a smart phone 1104, and a server computer 1106. The computing devices 1102-1106 can be communicably coupled with one another via the Internet 1110 or via another communication means, such as cellular microwave means.

In the present discussion, PC 1102 can be representative of any type of computer, such as a Unix based computer, or an Apple brand computer, among others. Smart phone 1104 can be representative of any number of ever evolving classes of computing devices that can offer one or more of: cellular service, internet service, and/or some processing capabilities combined with a GUI. Other current examples of this class can include personal digital assistants and cell phones, among others.

The present concepts can be employed with computing devices having various capabilities. For instance, the present concepts can be employed on a freestanding computing device where applications are run locally on the computing device to perform an associated functionality. PC 1102 can offer such an example, where a tracking module 1112(1), a color module 1114(1), and a painting module 1116(1) can operate locally. One or more of these components can alternatively or additionally operate on the server computer 1106 as indicated at 1112(2), 1114(2), and 1116(2). For sake of brevity no components are specifically designated for smart phone 1104, but the same freestanding and/or server client configurations can be implemented on the smart phone as the PC.

Tracking module 1112 can track a location and direction of movement of a cursor over a graphical user-interface. This information can be supplied to the color module 1114. The color module can obtain color information relating to user-controls on the graphical user-interface. The color module can use the color information to dynamically determine a highlight color, such as a dominant color of individual user-controls from the color information. An example of an algorithm that can be performed by the color module is described below in relation to FIG. 12. Painting module 1116 can paint a portion of the individual user-control with the highlight color determined by the color module.

Exemplary Methods

Figure 12:
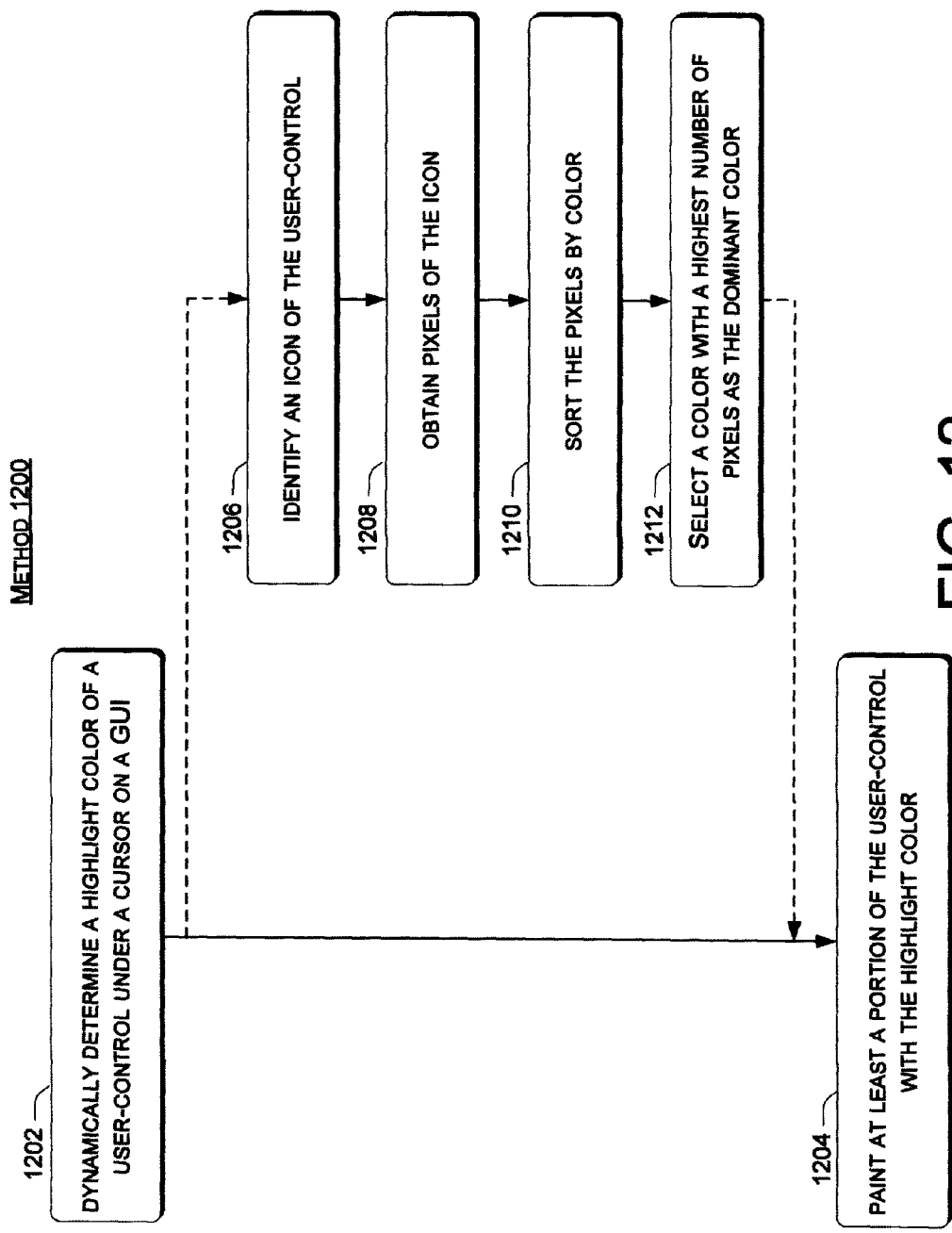
FIGS. 12-13 are flowcharts of exemplary dynamic user-control painting methods in accordance with some implementations of the present concepts.

FIG. 12 illustrates a flowchart of an algorithm or method 1200 that is consistent with at least some implementations of the present concepts. The order in which the method 1200 is described is not intended to be construed as a limitation, and any number of the described blocks can be combined in any order to implement the method, or an alternate method. Furthermore, the method can be implemented in any suitable hardware, software, firmware, or combination thereof such that a computing device, such as those described above in relation to FIG. 11 can implement the method. In one case, the technique is stored on a computer-readable storage media as a set of instructions such that execution by a computing device causes the computing device to perform the technique.

Blocks 1202 and 1204 introduce an exemplary method for dynamically painting user-controls. Blocks 1206-1212 offer one approach for accomplishing block 1202.

Block 1202 dynamically determines a highlight color of a user-control under a cursor on a graphical user-interface (GUI). For instance, a location and direction of cursor travel can be tracked. In some implementations, information about an individual user-control can be obtained as the cursor passes over the user-control. The process can be completed and the user-control painted in a few milliseconds so that from the user's perspective the cursor and the painting appear over the user-control at the same time. Other implementations can predict where the user will move the cursor based upon location and direction of movement and begin the method even before the cursor actually passes over an individual user-control. Still another implementation can obtain color data from all user-controls on a GUI and dynamically determine a highlighting color for each user-control. This highlighting color data can then be accessed as needed based upon cursor movement.

Block 1206 identifies an icon of the user control. This particular implementation further processes the icon as described below. However, a similar approach can be applied to user-controls that do not include icons. For instance, a user-control may contain text that can be processed in a similar manner.

Block 1208 obtains pixels of the icon. Block 1210 sorts the pixels by color. This process can be analogized to labeling a bucket for each color of the icon and placing the individual pixels in the corresponding buckets.

Block 1212 selects a color with the highest number of pixels as the highlight color which in this case is also the dominant color. In the bucket analogy, the bucket with the most pixels is selected as the dominant color. Some implementations do not consider some colors, such as black, white, and grey when selecting the dominant color. In some cases, a complementary color to the dominant color may also be identified to use in the painting.

After block 1212, the method returns to block 1204 which paints at least a portion of the user-control with the highlight color. In the method of blocks 1206-1212 the highlight color is the dominant color. Various examples of this painting are illustrated in FIGS. 1-10 above.

Figure 13:
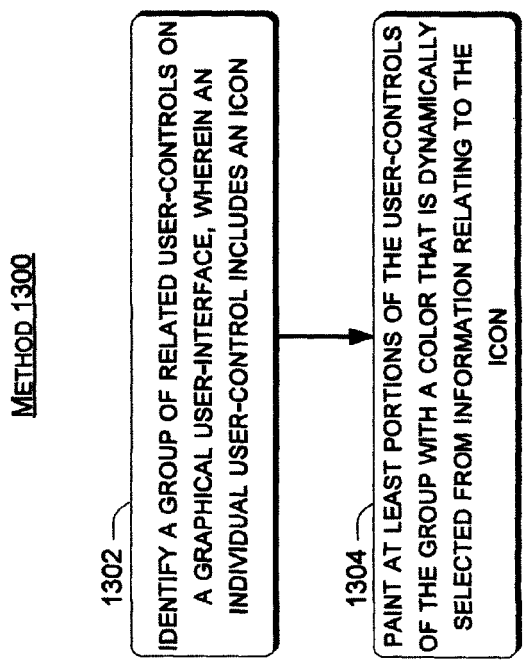

FIG. 13 illustrates another flowchart of an algorithm or method 1300 that is consistent with at least some implementations of the present concepts. The order in which the method 1300 is described is not intended to be construed as a limitation, and any number of the described blocks can be combined in any order to implement the method, or an alternate method. Furthermore, the method can be implemented in any suitable hardware, software, firmware, or combination thereof such that a computing device can implement the method. In one case, the method is stored on a computer-readable storage media as a set of instructions such that execution by a computing device causes the computing device to perform the method.

Block 1302 identifies a group of related user-controls on a GUI. Individual user-controls can include an icon. For instance, the group of user-controls may relate to an email application. In this example, the GUI may include a first user-control for the email application, a second user-control relating to an open received email and a third user-control may relate to an email that the user is drafting. Assume for discussion purposes, that each of the three above described user-controls contains an icon. In this example, the method can analyze color information from one or more of the icons. An example of such analysis is described above in relation to blocks 1206-1212 of FIG. 12.

Block 1304 paints at least portions of the user-controls of the group with a color (i.e., highlight color) that is dynamically selected from information relating to the icon(s). Continuing with the above described email example, the method can paint each of the three user-controls with the dynamically selected color from the icons so that the highlight color serves to group the user-controls for the user. This painting can aid the user to recognize that each of the grouped user-controls relates to a function associated with the functionality (i.e., an email functionality).

In summary, the above techniques can dynamically generate visual clues about the user-controls to enhance the user experience.

CONCLUSION

Although techniques, methods, devices, systems, etc., pertaining to dynamically painting user-controls are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system, comprising:
a tracking module configured to track location and direction of movement of a cursor over a graphical user-interface, the graphical user-interface comprising a plurality of user controls;
a color module configured to:
obtain color information using pixels of an icon included in an individual user-control of the plurality of user-controls, the individual user-control being identified based on the location or the direction of movement of the cursor; and
determine a highlight color of the individual user-control from the color information, the highlight color being determined from a dominant color of the icon, wherein the individual user-control comprises at least one color that is different than the dominant color of the icon;
a painting module configured to paint portions of the individual user-control under the cursor with the highlight color as the cursor moves across the graphical user-interface, wherein the painted portions return to the at least one color after being painted; and a computing device configured to execute one or more of the tracking module, the color module, or the painting module.

2. The system of claim 1, wherein the color module is configured to identify the icon of the individual user-control and obtain the pixels from the icon.

3. The system of claim 1, wherein the color module is configured to sort the pixels of the icon by color to determine the dominant color of the icon.

4. The system of claim 1, wherein the painting module is configured to paint the portion of the individual user-control with a pair of concentric glows having the location of the cursor as a focus.

5. The system according to claim 1, wherein the highlight color comprises the dominant color of the icon.

6. The system according to claim 1, wherein the highlight color comprises a complementary color relative to the dominant color of the icon.

7. A method, comprising:
dynamically determining a highlight color of an individual user-control on a graphical user-interface (GUI) of a computing device on which a plurality of user-controls are displayed, the highlight color being determined by:
tracking location of a cursor to identify the individual user-control from the plurality of user-controls that are displayed on the GUI of the computing device,
obtaining pixels of an icon that is contained in the individual user-control, and
selecting the highlight color based on the obtained pixels of the icon contained in the individual user-control; and
causing the computing device to temporarily paint different portions of the individual user-control with the highlight color as the cursor is moved over the individual user-control,
wherein the different portions of the individual user control that are painted with the highlight color are determined based on the location of the cursor.

8. The method of claim 7, further comprising:
sorting the obtained pixels of the icon by color to determine the highlight color.

9. The method of claim 8, wherein the dynamically determining comprises determining the highlight color as the color associated with a highest number of obtained pixels.

10. The method of claim 9, wherein the dynamically determining excludes white, black, grey and transparent when determining the highlight color.

11. The method of claim 7, wherein the temporarily painted different portions convey the location and a direction of the cursor relative to the individual user-control.

12. The method of claim 7, further comprising temporarily painting the different portions by generating a glow around the cursor.

13. The method of claim 7, further comprising temporarily painting the different portions by generating inner and outer concentric glows around the cursor.

14. The method of claim 13, wherein the inner glow is relatively concentrated and the outer glow is relatively diffuse.

15. The method of claim 7, further comprising temporarily painting an individual portion of the individual user-control by generating a refractory affect on one or more edges of the individual user-control proximate to the temporarily painted individual portion.

16. A computing device having stored computer-executable instructions that when executed by the computing device perform operations, comprising:
tracking a location of a cursor having a direction of movement over a graphical user-interface, the graphical user-interface displaying a plurality of user controls;
obtaining pixels of an icon included in an individual user-control from the plurality of user controls displayed on the graphical user-interface, the pixels of the icon comprising a first color and the individual user-control comprising a second color that is different than the first color;
determining a highlight color of the individual user-control from the pixels of the icon included in the individual user-control; and
temporarily painting different portions of the individual user-control under the cursor with the highlight color, the different portions being temporarily painted as the cursor is moved across the individual user-control to convey movement of the cursor over the individual user-control having the second color that is different than the first color of the pixels of the icon.

17. The computing device of claim 16, the operations further comprising:
predicting where a user will move the cursor based on the location and the direction of movement of the cursor; and
beginning to dynamically determine the highlight color before the cursor actually passes over the individual user-control.

18. The computing device of claim 16, wherein the pixels of the icon are obtained from the individual user-control as the cursor passes over the individual user-control.

19. The computing device of claim 16, the operations further comprising:
before the cursor passes over the individual user-control:
obtaining the pixels of the icon and other pixels of other icons included in the plurality of user controls, and
determining multiple highlight colors for the plurality of user controls; and
accessing the multiple highlight colors as needed based on cursor movement over the graphical user-interface.

20. The computing device of claim 16, wherein the highlight color is determined dynamically.

* * * * *

UNITED STATES PATENT AND TRADEMARK OFFICE
CERTIFICATE OF CORRECTION

PATENT NO. : 8,490,026 B2  
APPLICATION NO. : 12/290151  
DATED : July 16, 2013  
INVENTOR(S) : Sareen et al.

Page 1 of 1

It is certified that error appears in the above-identified patent and that said Letters Patent is hereby corrected as shown below:

On the Title Page

Item (75), under "Inventors" column 1, line 3, delete "Seattle, WA (US)" and insert -- Snohomish, WA (US) --, therefor.

Item (75), under "Inventors" column 1, line 5, delete "Puyallup, WA (US)" and insert -- Kirkland, WA (US) --, therefor.

In the Claims

In column 7, line 37, In Claim 7, delete "user control" and insert -- user-control --, therefor.

In column 8, line 13, In Claim 16, after "operations" delete ",".

Signed and Sealed this  
Third Day of February, 2015

Michelle K. Lee  
*Deputy Director of the United States Patent and Trademark Office*